United States Patent
Nagura et al.

(10) Patent No.: US 9,476,720 B2
(45) Date of Patent: Oct. 25, 2016

(54) TERMINAL DEVICE

(71) Applicant: DENSO CORPORATION, Kariya, Aichi-pref. (JP)

(72) Inventors: Toru Nagura, Kariya (JP); Tsuneo Nakata, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/950,005

(22) Filed: Nov. 24, 2015

(65) Prior Publication Data

US 2016/0146612 A1 May 26, 2016

(30) Foreign Application Priority Data

Nov. 26, 2014 (JP) ................. 2014-238718

(51) Int. Cl.
*G01C 21/30* (2006.01)
(52) U.S. Cl.
CPC .................... *G01C 21/30* (2013.01)
(58) Field of Classification Search
CPC ..................................... G01C 21/20
USPC .......................................... 701/518
See application file for complete search history.

(56) References Cited

U.S. PATENT DOCUMENTS

2009/0201410 A1* 8/2009 Nishiguchi ........ H04N 5/23212 348/345
2013/0310067 A1 11/2013 Nakata

FOREIGN PATENT DOCUMENTS

JP 2013-257306 12/2013

* cited by examiner

*Primary Examiner* — McDieunel Marc
*Assistant Examiner* — James E Stroud
(74) *Attorney, Agent, or Firm* — Harness, Dickey & Pierce, P.L.C.

(57) ABSTRACT

A terminal device includes a communication state obtain unit that obtains a state of wireless communication, a travel locus information generation unit that generates travel locus information, a reference locus information obtain unit that obtains reference locus information, a measurement unit that obtains a position of a movable body along a travel direction based on a matching between the travel locus information and the reference locus information, a mismatch detection unit that detects at least one of (i) mismatch degree between the travel locus information and the reference locus information in the matching, and (ii) a cause of mismatch in the matching, and a filtering unit that filters at least one of the travel locus information and the reference locus information. The measurement unit performs the matching before the filtering, which increases the measurement accuracy of the terminal device.

6 Claims, 10 Drawing Sheets

TERMINAL DEVICE

CROSS REFERENCE TO RELATED APPLICATION

The present application is based on and claims the benefit of priority of Japanese Patent Application No. 2014-238718, filed on Nov. 26, 2014, the disclosure of which is incorporated herein by reference.

TECHNICAL FIELD

The present disclosure generally relates to a terminal device.

BACKGROUND INFORMATION

The positioning system for positioning a vehicle conventionally performs a positioning process in the following manner. That is, an in-vehicle device in the positioning system detects a signal intensity of a received signal (i.e., Received Signal Strength Indicator (RSSI)), and generates travel locus information that associates the RSSI with a travel locus. Then, the in-vehicle device compares the travel locus information with reference locus information (i.e., reference locus information: associating a distance between a reference position closes to a reference station and a subject vehicle with RSSI), for estimating the position of the vehicle. (See for example, a patent document, Japanese Patent Laid-Open No. JP 2013-257306.)

SUMMARY

It is an object of the present disclosure to provide a terminal device that prevents a deterioration of estimation accuracy regarding a vehicle position due to a disturbance to information about a travel locus and/or a reference locus.

In an aspect of the present disclosure, the terminal device includes a communication state obtain unit that obtains a state of wireless communication for a movable body, a travel locus information generation unit that generates travel locus information that associates each of positions along a travel direction of the movable body with the state of wireless communication at each of the positions of the movable body, a reference locus information obtain unit that obtains reference locus information, the reference locus information including the travel locus information regarding a past travel of the movable body or other objects, and at least one position in the reference locus information referring to a feature point defined as an absolute position, a measurement unit that obtains a position of the movable body along a travel direction based on a matching between the travel locus information and the reference locus information and a finding of a positional relationship between the feature point and the position along the travel direction.

Further, the terminal device includes: an mismatch detection unit detecting one of (i) a degree of mismatch in the matching by the measurement unit and (ii) a cause of mismatch in the matching by the measurement unit; and a filtering unit filtering at least one of the travel locus information and the reference locus information, a method of the filtering being preset according to one of the mismatch and the cause of the mismatch, and the measurement unit performs the matching before the filtering by the filtering unit, which enables an improvement of the measurement accuracy by the terminal device.

The terminal device in the present disclosure reduces mismatch between the travel locus information and the reference locus information, by performing the filtering of a preset type for at least one of the travel locus information and the reference locus information, and the filtering of the preset type is chosen based on the mismatch itself or based on the cause of the mismatch. As a result, the position estimation accuracy for estimating the position of the movable body is improved.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Embodiments of the present disclosure are described with reference to the figures.

First Embodiment

1. Configuration of Terminal Device 1 and Position Estimation System 3

Figure 1:
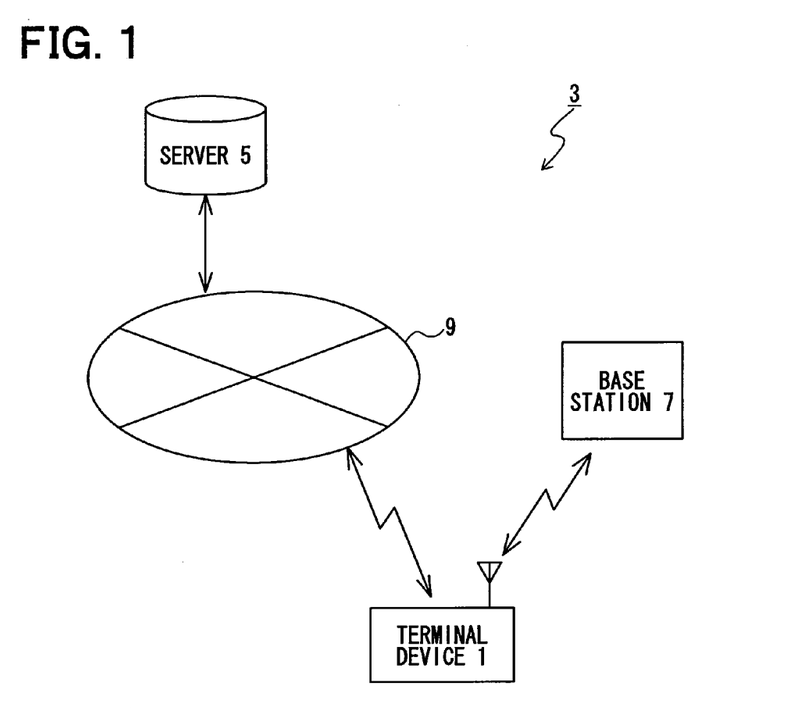
FIG. 1 is a configuration diagram of a position estimation system in a first embodiment of the present disclosure.
Figure 2:
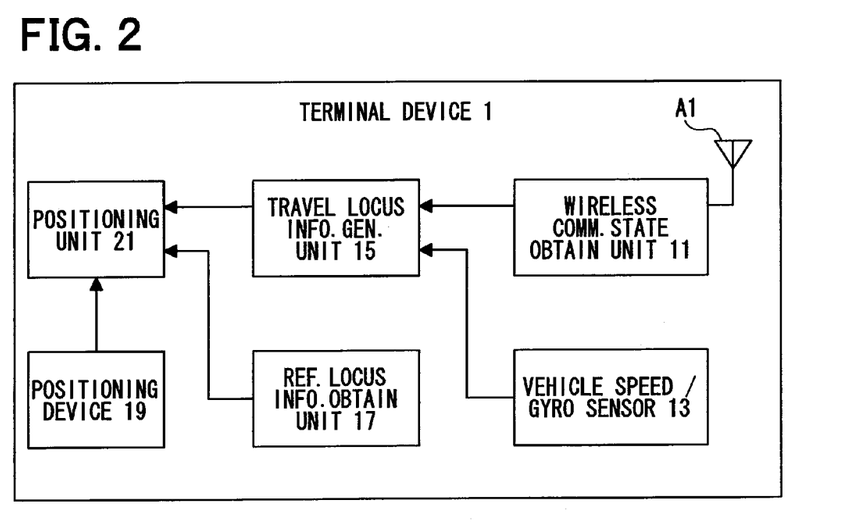
FIG. 2 is a block diagram of a terminal device.
Figure 3:
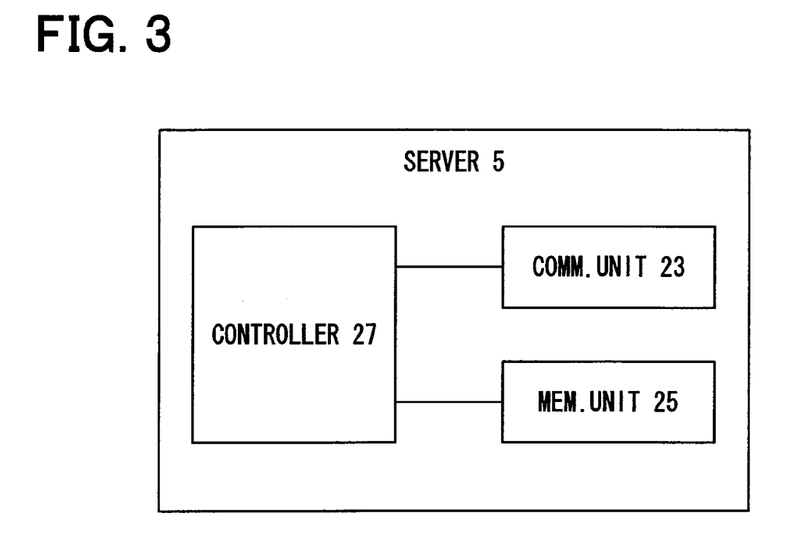
FIG. 3 is a block diagram of a server.

Based on FIGS. 1 to 3, the configurations of the terminal device 1 and the position estimation system 3 are described. As shown in FIG. 1, the position estimation system 3 includes the terminal device 1, a server 5, and a base station 7. The terminal device 1 and the server 5 communicate with each other via an internet channel 9.

The terminal device 1 is a device that can be disposed in a vehicle (i.e., an example of a movable body). In the following description, a vehicle having the terminal device 1 is designated as a subject vehicle.

The terminal device 1 is provided with an antenna A1, a wireless communication state obtain unit 11, a vehicle speed and gyro sensor 13, a travel locus information generation unit 15, a reference locus information obtain unit 17, a positioning device 19, and a positioning unit 21 as shown in FIG. 2.

The wireless communication state obtain unit 11 detects a radio reception state by the antenna A1. The received wave received by the antenna A1 is a radio wave which is continuously transmitted by the base station 7. The received wave received by the antenna A1 may be an environmental radio wave. When the received wave is the environmental radio wave, the base station 7 may be dispensed.

The wireless communication state is, in substance, RSSI. The wireless communication states may also be a slope of the received signal strength, a phase difference between two adjacent sub-channels when the received wave is divided into multiple sub-channels, a received signal strength of one of the multiple sub-channels, or the like.

The vehicle speed and gyro sensor 13 detect a vehicle speed of the subject vehicle and a travel direction of the subject vehicle.

The travel locus information generation unit 15 generates travel locus information that is mentioned later.

The reference locus information obtain unit 17 obtains the reference locus information mentioned later from the server 5.

The positioning device 19 is provided with a Global Positioning System (GPS), and can perform the positioning of the subject vehicle by using the GPS.

The positioning unit 21 performs positioning by a process that is mentioned later.

The positioning unit 21 is an example of a mismatch detection unit and a filtering unit.

The server 5 is provided with a communication unit 23, a memory unit 25, and a controller 27 as shown in FIG. 3.

The communication unit 23 performs communication with the terminal unit 1.

The memory unit 25 memorizes reference locus information that is mentioned later.

The reference locus information is classified and memorized in multiple classifications. In one classification, the reference locus information corresponding to only one road, one section, and one travel direction is memorized.

The controller 27 transmits the reference locus information according to the request from the vehicle as mention later. Further, the controller 27 updates, as mentioned later, the reference locus information by receiving the travel locus information from the vehicle.

2. Process Performed by Terminal Unit 1

Figure 4:
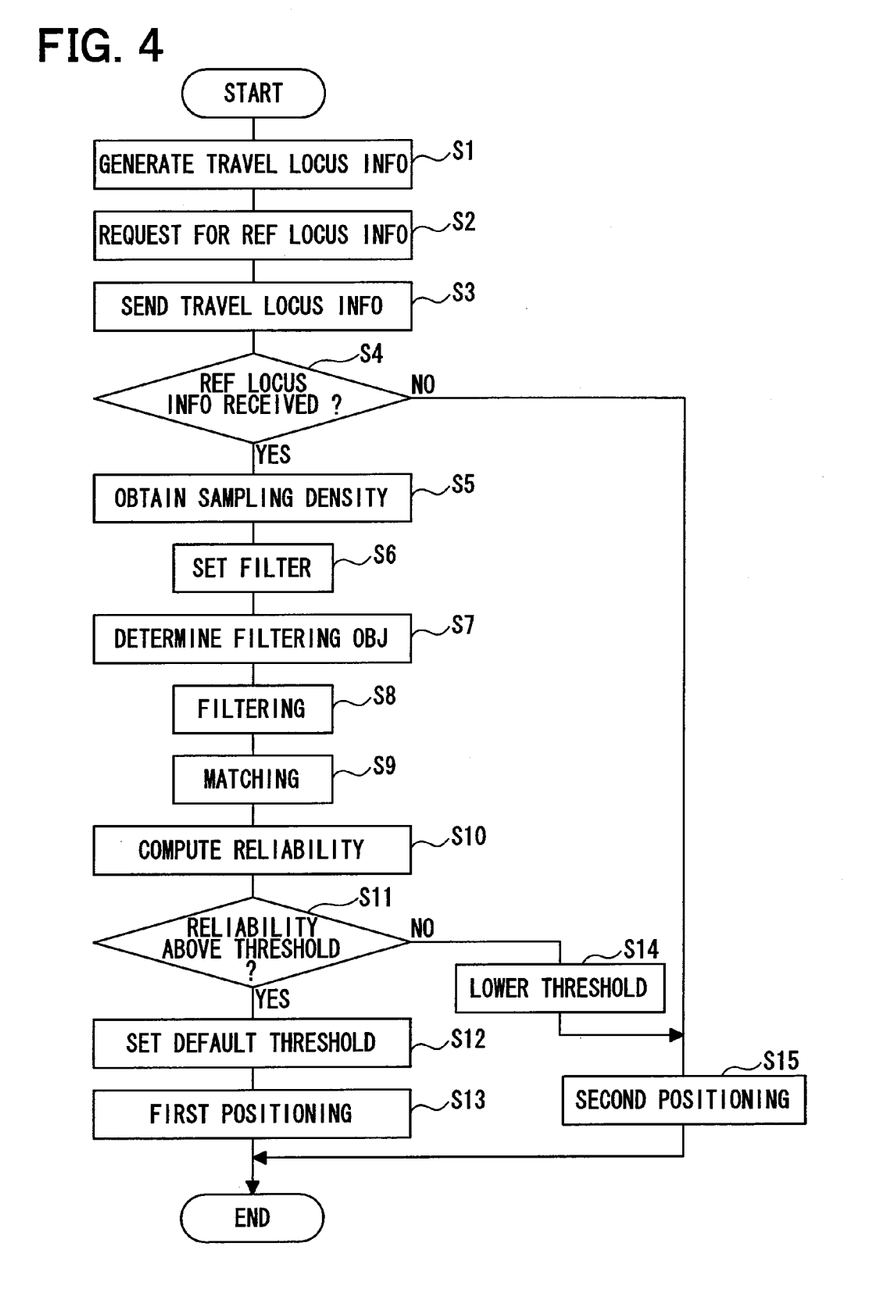
FIG. 4 is a flowchart of a process performed by the terminal device.
Figure 5:
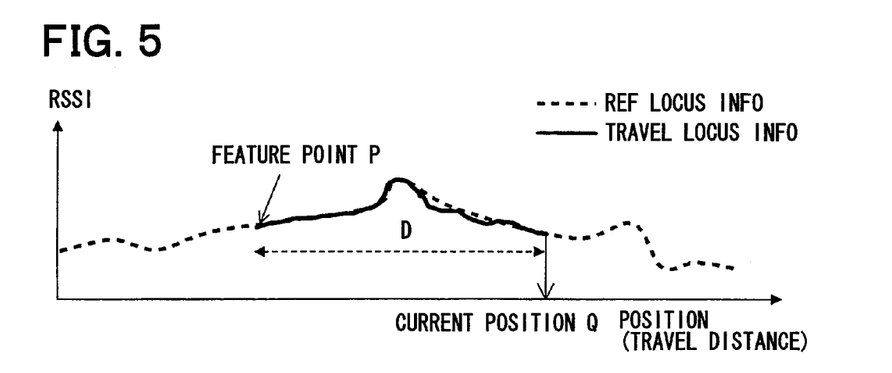
FIG. 5 is a diagram about travel locus information and reference locus information.
Figure 6:
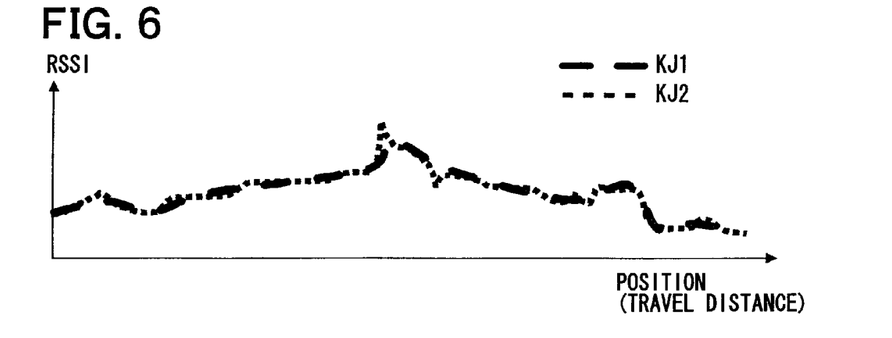
FIG. 6 is a diagram about low sampling rate locus information and high sampling rate locus information.

The process performed by the terminal device 1 at a preset interval is described based on FIGS. 4 to 6.

In Step S1 of FIG. 4, the travel locus information generation unit 15 generates travel locus information. The travel locus information is, as shown in FIG. 5, information that associates each of several positions of the subject vehicle along a travel direction with a wireless communication state (RSSI) of the antenna A1 at each of those positions.

The travel locus information is generated in the following manner. When the subject vehicle is traveling, the terminal device 1 obtains RSSI of the antenna A1 by using the wireless communication state obtain unit 11 repeatedly. The terminal device 1 estimates a travel distance of the subject vehicle by using the vehicle speed and gyro sensor 13, in parallel with the obtainment of RSSI. Then, by associating each of the positions on a travel locus of the subject vehicle (i.e., each of the positions along the travel direction of the subject vehicle) with an RSSI of the antenna A1 at each of those positions, the terminal device 1 generates the travel locus information.

In Step S2, the reference locus information obtain unit 17 transmits a signal which requests for a transmission of the reference locus information to the server 5. The reference locus information that is requested for is the reference locus information corresponding to a road on which the subject vehicle is traveling, and, more specifically, the reference locus information corresponds to a section of the traveling road on which the subject vehicle is traveling, and also the reference locus information corresponds to a travel direction of the subject vehicle.

In Step S3, the travel locus information generation unit 15 transmits, to the server 5, the travel locus information generated in Step S1, together with the position of the subject vehicle and the traveling direction of the subject vehicle. The server 5 updates, as described later, the reference locus information by using the transmitted travel locus information and the like.

Here, the reference locus information is described.

The reference locus information is the travel locus information at a time when the subject vehicle or the other vehicle traveled the same section of the same road in the same direction as the currently-traveling direction of the subject vehicle. An example of the reference locus information is shown in FIG. 5. Further, the reference locus information includes information about a feature point P about which an absolute position is known (i.e., a latitude and a longitude of the point P is known).

The reference locus information is memorized in the server 5 and transmitted to the terminal device 1 according to a request from the terminal device 1. The reference locus information is updated as required in the server 5 by using a newly received travel locus information. The feature point P mentioned above is added to the information by the server 5.

In Step S4, the reference locus information obtain unit 17 determines whether the reference locus information requested in Step S2 is received from the server 5. The process proceeds to Step S5 when the information has already been received. The process proceeds to Step S15 when the information has not been received.

In Step S5, the positioning unit 21 obtains a sampling density about each of (i) the travel locus information generated in Step S1 and (ii) the reference locus information that has been determined as received in Step S4. The sampling density means the number of data entries about the wireless communication state which exists in a unit travel distance. The sampling density becomes low when the travel speed of the vehicle at the time of generating the travel locus information is high. FIG. 6 shows locus information (i.e., either the travel locus information or the reference locus information) with low sampling density, which is designated as KJ1, and locus information (i.e., either the travel locus information or the reference locus information) with high sampling density KJ2.

In Step S6, the positioning unit 21 sets up a filter that is used for filtering of the travel locus information or the reference locus information. The filter in this case is a low-pass filter. The low-pass filter is a filter which passes relatively low spatial frequency components and cuts relatively high spatial frequency components regarding the spatial frequency of the locus information, which is shown in FIGS. 5 and 6, for example, with a vertical axis of the RSSI and a horizontal axis of the travel distance, as a wave form of each of the travel locus information and the reference locus information.

In Step S7, the positioning unit 21 determines an object to which the filter set up in Step S6 is applied. More practically, from among the travel locus information and the reference locus information, the one having a higher sampling density is picked up as an object of the filtering. However, both of the travel locus information and the reference locus information may be picked up as an object of the filtering.

In Step S8, the positioning unit 21 performs the filtering of the object picked up in Step S7 with the filter set in Step S6.

In Step S9, the positioning unit 21 performs (i.e., examines) matching between the travel locus information and the reference locus information. Here, when the filtering is performed to the travel locus information in Step S8, the travel locus information after the filtering is used for the matching. When the filtering is performed to the reference locus information in Step S8, the reference locus information after the filtering is used for the matching.

Further, when the filtering is performed to both of the travel locus information and the reference locus information in Step S8, the travel locus information after the filtering and the reference locus information after the filtering are used for the matching.

The matching is a process which searches for a position where a matching degree or amount between the reference locus information and the travel locus information is maximized. The maximization of the matching degree may be performed for the wave form shown in FIG. 5, for example, by shifting the travel locus information along the horizontal axis relative to the reference locus information.

The matching may also be defined as a process of searching for τ that maximizes Rfg(τ) represented as an equation (3).

Number 1

$$f'(s) = h_{LPF}(s) * f(s) \quad \text{Equation 1:}$$

$$g'(s) = h_{LPF}(s) * g(s) \quad \text{Equation 2:}$$

$$R_{fg}(\tau) = \int_{-D_1}^{D_2} f'(s) g'(s-\tau) ds \quad \text{Equation 3:}$$

Rfg(τ) represents a magnitude, or a size, of mismatch between the travel locus information and the reference locus information. Now, in an equation 1, f'(s) is the reference locus information after the filtering at a travel distance s, and g'(s−τ) is the travel locus information after the filtering at a travel distance s−τ. Further, f'(s) is, as shown in the equation 1, represented by using the pre-filtering reference locus information f(s) and a coefficient $h_{LPF}(s)$ corresponding to the filtering. Further, g'(s) is, as shown in the equation 2, is represented by using the pre-filtering travel locus information g(s) and a coefficient $h_{LPF}(s)$ corresponding to the filtering.

In Step S10, the positioning unit 21 computes a reliability of the matching performed in Step S9. The reliability is represented as a value that becomes large as the maximum value of Rfg(τ) (i.e., hereafter designated as maxRfg(τ)) becomes large. The relationship between the reliability and the maxRfg(τ) is set in advance.

In Step S11, it is determined whether the reliability computed by the positioning unit 21 in Step S10 is equal to or greater than a preset threshold that is set in advance. When the reliability is equal to or greater than the threshold, the process proceeds to Step S12, and, when the reliability is less than the threshold, the process proceeds to Step S14.

In Step S12, the positioning unit 21 chooses the threshold used for the determination in Step S11 as a default value.

In Step S13, the positioning unit 21 performs a first positioning process. The first positioning process is a process in which a position of the subject vehicle in a travel direction is obtained based on a positional relationship between (i) the feature point P shown in FIG. 5 and (ii) the current position Q of the subject vehicle in the travel locus information.

Since the coordinates of the feature point P are known as mentioned above, if a distance D (i.e., a distance between the feature point P and the current position Q) is added to the coordinates of the feature point P, the position coordinates of the current position Q (i.e., a position of the subject vehicle in the travel direction of the road) is computable. The distance D is computable as a distance between the feature point P and the current position Q based on the travel locus information.

On the other hand, when the determination in Step S11 is negative, the process proceeds to Step S14, and the threshold used in the determination Step S11 is set to a smaller value that is smaller than the current threshold by a preset amount. The preset amount of deduction from the current threshold is a fix amount set in advance.

When the determination is negative in Step S4 or in Step S14, the process proceeds to Step S15, and the positioning unit 21 performs a second positioning process. The second positioning process is a process in which a well-known positioning is performed, such as a dead-reckoning (DR), or a self-contained navigation (SCN) using the vehicle speed and gyro sensor 13.

3. Process Performed by Server 5

Figure 7:
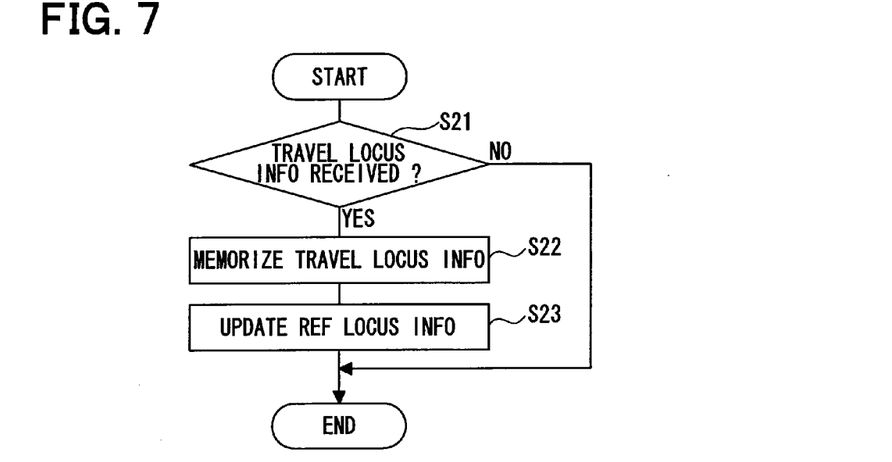
FIG. 7 is a flowchart of a process performed by the server.

The process performed by the server 5 (i.e., the controller 27) at preset interval is described with reference to FIG. 7.

In Step S21, it is determined whether the communication unit 23 has received the travel locus information. When the information has been received, the process proceeds to Step S22. When the information has not been received, the process is finished. The travel locus information is the one transmitted by the terminal device 1 in Step S3 as described above.

In Step S22, the travel locus information received in Step S21 is classified according to the travel direction and the position of the subject vehicle (i.e., the section of a particular road the subject vehicle is traveling), and is memorized to the memory unit 25.

In Step S23, the server 5 reads, from the memory unit 25, all the travel locus information belonging to the same classification as the travel locus information memorized in Step S22. When the travel locus information read in Step S23 is a single piece of information, the information read in Step S23 (i.e., the as-is information) is memorized to the memory unit 25 as the updated reference locus information (i.e., as the reference locus information after the updating).

Further, the travel locus information read in Step S23 is plural pieces of information, the averaged travel locus information is computed. The averaged travel locus information is the travel locus information with the averaged RSSI associated to each of the positions on the travel locus. That is, in other words, the RSSI of one position on the travel locus is represented as an average of the travels through the same position in the past, or as an average of travels of many vehicles through the same position. The averaged travel locus information is memorized to the memory unit 25 in as the updated reference locus information.

Further, upon receiving a signal that requests for the transmission of the reference locus information (refer to Step S2), the server 5 transmits the reference locus information corresponding to the request.

4. Effects of Terminal Unit 1

(1A) In the travel locus information and the reference locus information, the higher the sampling density is, the greater the percentage of the high spatial frequency component becomes. When the sampling densities are different between the travel locus information and the reference locus information, the degree of mismatch becomes greater in the matching process. That is, in other words, the difference of the sampling densities among the travel locus information and the reference locus information leads to the mismatching of the two information.

The terminal device 1 obtains the sampling density of the travel locus information and the reference locus information, respectively. Then, the filtering with the low-pass filter is performed at least for the one having the higher sampling density, for the reduction of the high spatial frequency components. The reduction of the higher spatial frequency components leads to a higher degree of matching in the matching process between the travel locus information and the reference locus information. As a result, the matching between actual and reference loci is accurately performed, and the positioning accuracy of the subject vehicle is improved.

(1B) Every time the terminal device 1 performs the process of Step S14, the threshold used by the determination of Step S11 is lowered to a smaller value. Therefore, as the time after the last positive determination in Step S11 becomes longer (i.e., as the time after the latest first positioning becomes longer), the threshold is lowered, making it easier to result in the positive determination in Step S11.

In the above-described situation, as the time after the latest first positioning becomes longer, the error in the second positioning becomes greater.

The above-described threshold lowering scheme for the first positioning is thus beneficial, because the first positioning is more easily performable than the second positioning, thereby preventing the error-prone second positioning from being performed.

Second Embodiment

1. Configuration of Terminal Device 1 and Position Estimation System 3

The configuration of both of the terminal device 1 and the position estimation system 3 is the same as that of the first embodiment.

2. Process Performed by Terminal Unit 1

Figure 8:
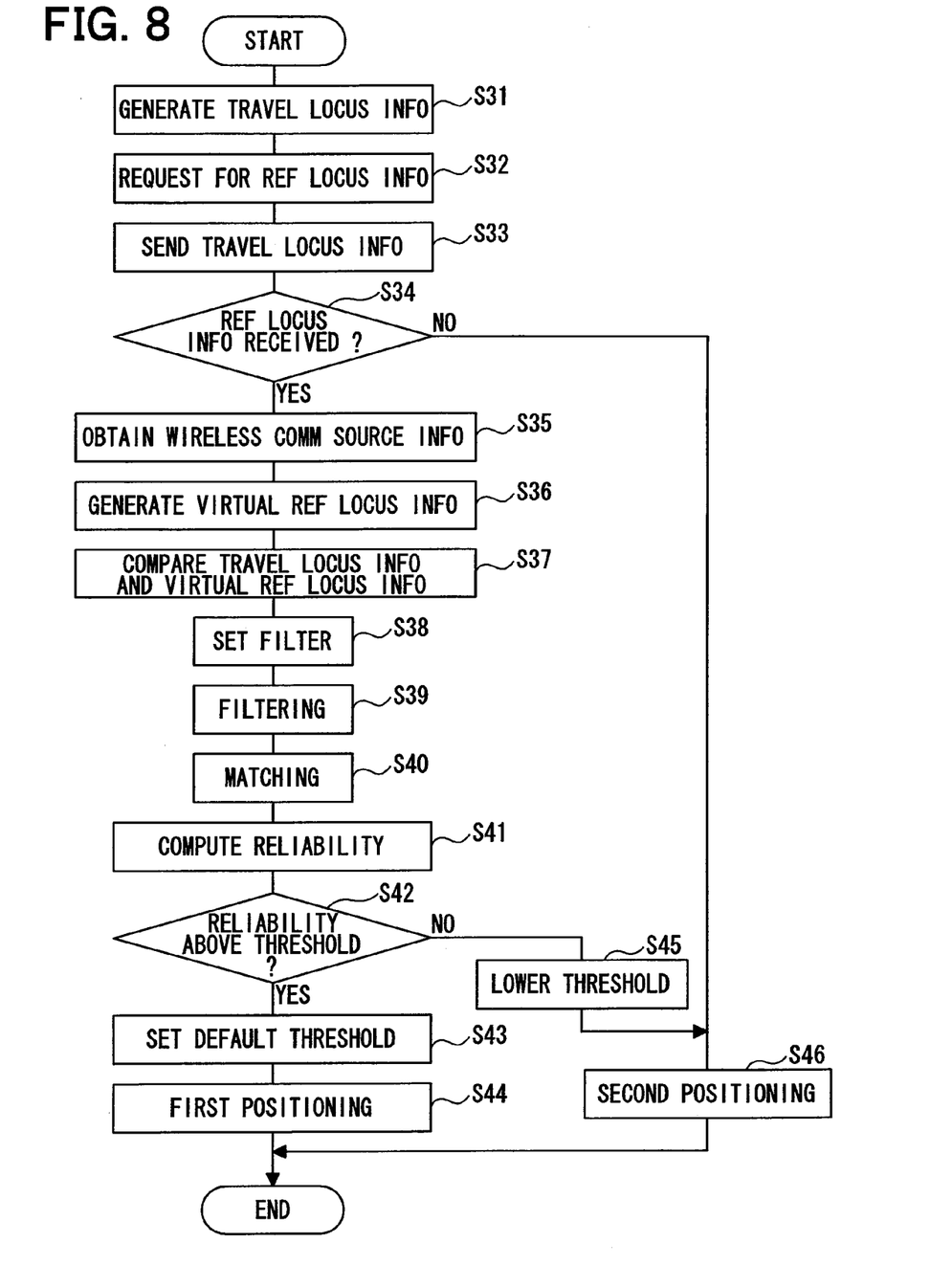
FIG. 8 is a flowchart of a process performed by the terminal device in a second embodiment of the present disclosure.

The process performed by the terminal device 1 is shown in FIG. 8. The process in FIG. 8 is fundamentally the same as the one in the first embodiment. The same part of the process is omitted from the following description, and the difference between the first embodiment and the second embodiment is mainly described.

The process in Step S31 to S34 of FIG. 8 is the same as the process of Step S1 to S4 in the first embodiment.

In Step S35, the positioning unit 21 receives the wireless communication source information that is transmitted by the server 5. The wireless communication source information includes: (a) a position of the base station 7, (b) an altitude of the base station 7, (c) a transmission cycle of the base station 7 regarding the wireless communication, (d) a transmission frequency of the wireless communication, (e) a transmission power of the wireless communication, (f) a directivity of the antenna used for the transmission of the wireless communication.

The wireless communication source information may not necessarily be all of the above-mentioned items of (a) to (f), but may be a part of them.

The server 5 may transmit the wireless communication source information periodically, and may transmit on demand (i.e., according to the request from the terminal device 1). The positioning unit 21 is an example of the wireless communication source information obtain unit.

In Step S36, the positioning unit 21 generates virtual reference locus information from the wireless communication source information received in Step S35. The virtual reference locus information is the travel locus information received by (i.e., reached) the subject vehicle, assuming that (i) the information is transmitted from the base station 7 under a specific condition that is specified by the wireless communication source information, and (ii) the information via the wireless communication reached the subject vehicle without reflection and diffraction.

Figure 9:
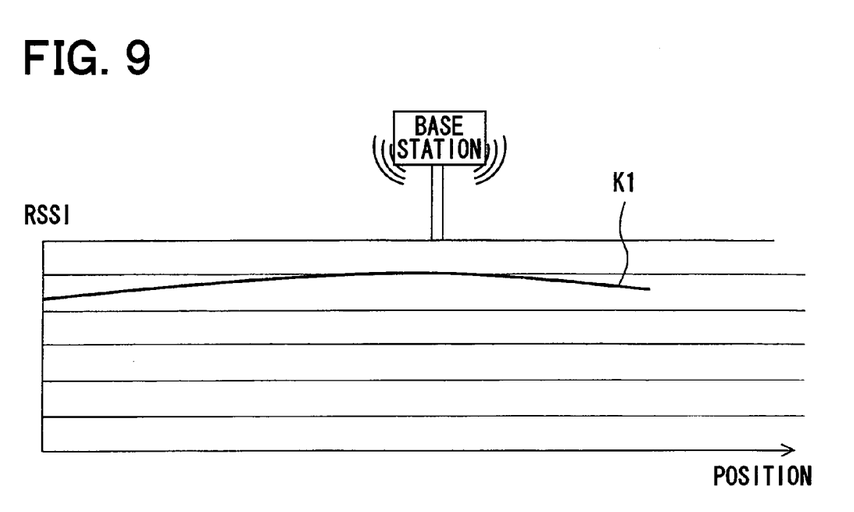
FIG. 9 is a diagram of virtual reference locus information.

An example of virtual reference locus information KI is shown in FIG. 9. RSSI of the virtual reference locus information KI takes the maximum value at a position where the subject vehicle is closest to the base station 7. The positioning unit 21 is an example of the virtual reference locus information generation unit.

In Step S37, the travel locus information generated in Step S31 and the virtual reference locus information generated in Step S36 are compared with each other.

The main pass of the wireless communication between the base station 7 and the terminal device 1 may sometimes be intercepted by the other vehicle, or the information via the wireless communication may be reflected or may be diffracted by some objects before being received by the terminal device 1. Further, when the travel locus derived from the travel locus information and the travel locus derived from the virtual reference locus are mismatching, a damping factor of the reception intensity may change among them. In such case, the travel locus information shows a characteristic feature.

Figure 10A:
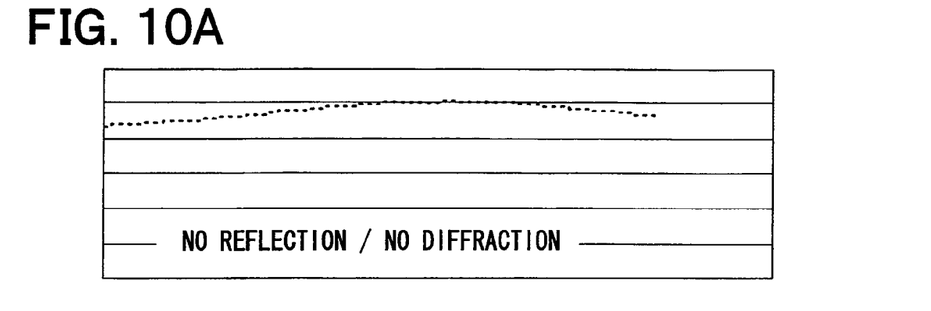
FIGS. 10A/B/C/D are travel locus information with or without reflection and diffraction.

FIG. 10A shows the travel locus information in which there is no reflection and no diffraction.

Figure 10B:
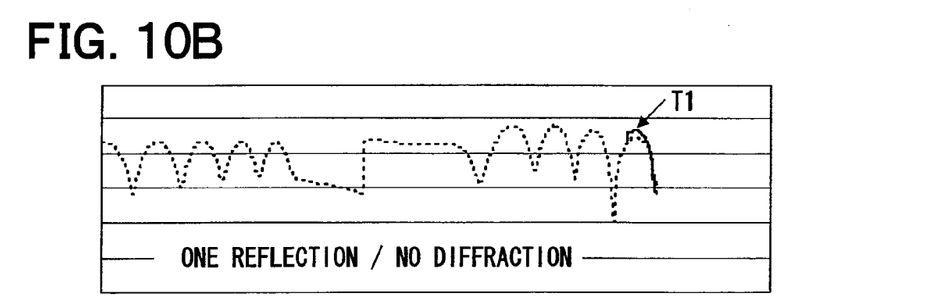

FIG. 10B shows the travel locus information in the which there is one reflection and no diffraction. In this travel locus information, a feature T1 resulting from the reflection appears.

Figure 10C:
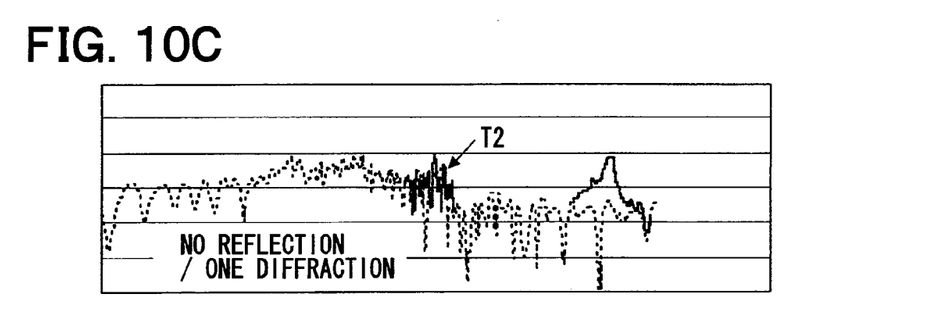

FIG. 10C shows the travel locus information in which there is no reflection but there is one diffraction. In this travel locus information, a feature T2 resulting from the diffraction appears.

Figure 10D:
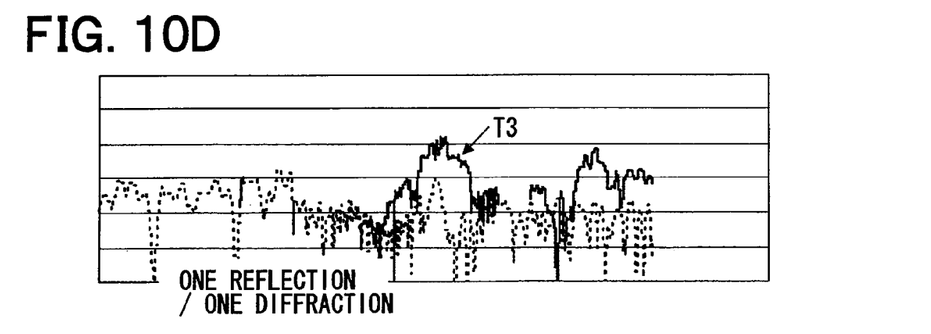

FIG. 10D shows the travel locus information in which there is one reflection and one diffraction. In this travel locus information, a feature T3 resulting from the reflection and the diffraction appears.

On the other hand, any feature resulting from the reflection or the diffraction does not appear in the virtual reference locus information. In this Step S37, the feature resulting from the reflection and the diffraction, and from damping of the travel locus information is detected by comparing the travel locus information and the virtual reference locus information.

Figure 11A:
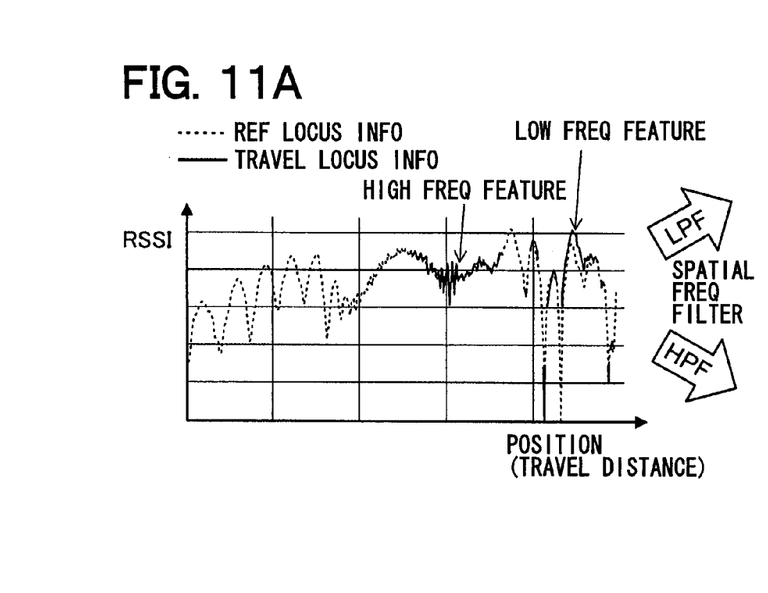
FIGS. 11A/B/C are diagrams about the travel locus information among which high spatial frequency and low spatial frequency features appearing in FIG. 11A are low-pass filtered in FIG. 11B and high-pass filtered in FIG. 11C.

In Step S38, a filter which can reduce the feature detected in Step S37 is set. When the high spatial frequency feature shown in FIG. 11A is detected, for example, the low-pass filter is set. When the low spatial frequency feature shown in FIG. 11A is detected, for example, the high-pass filter is set.

In Step S39, the filtering of the travel locus information is performed by using the filter set in Step S36.

Figure 11B:
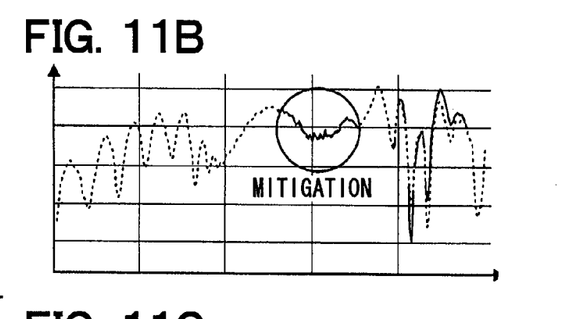
Figure 11C:
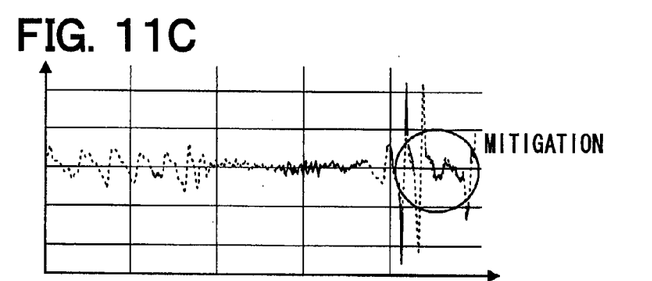

For example, when the high frequency feature in FIG. 11A is detected and the filtering by using the low-pass filter is performed, as shown in FIG. 11B, the high frequency feature is decreased (i.e., is mitigated). When the low frequency feature in FIG. 11A is detected and the filtering by using the high-pass filter is performed, as shown in FIG. 11C, the low frequency feature is decreased (i.e., is mitigated).

The process in Step S40 to S46 is the same as the process in Step S9 to S15 in the first embodiment.

3. Effect of Terminal Unit 1

According to the present embodiment, in addition to the effects (1B) of the first embodiment mentioned above, the following effects are further achieved.

(2A) According to the present embodiment, based on the comparison between the travel locus information and the virtual reference locus information in Step S37, the feature (i.e., an example of the factor of mismatch) resulting from the reflection, diffraction, and damping that appear in the travel locus information is detected. Then, a filter for reducing such a feature is set (Step S38) and the filtering is performed by using the filter (Step S39), thereby enabling a reduction of (i.e., mitigating) the feature resulting from the reflection, diffraction and/or damping that appear in the travel locus information. Therefore, the matching between actual and reference loci is accurately performed, and the positioning accuracy of the subject vehicle is improved.

Third Embodiment

1. Configuration of Terminal Device 1

The configuration of the terminal device 1 regarding the position estimation system 3, and position estimation system 3 is the same as that of the first embodiment.

2. Process Performed by Terminal Unit 1

Figure 12:
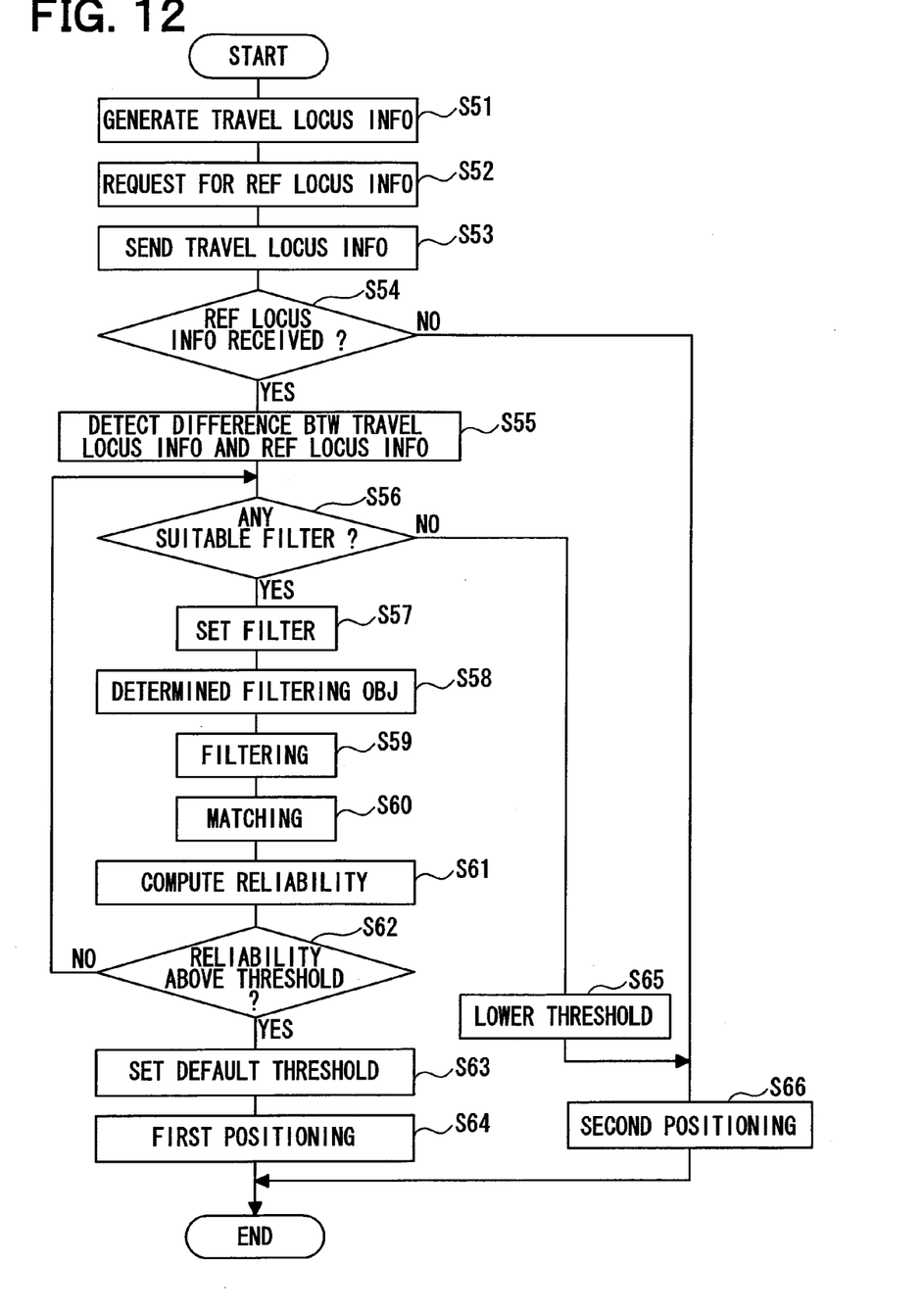
FIG. 12 is a flowchart of the process performed by the terminal device in a third embodiment of the present disclosure.

The process performed by the terminal device 1 is shown in FIG. 12. The process in FIG. 12 is fundamentally the same as the first embodiment. The same part of the process is omitted from the following description, and the difference between the first embodiment and the third embodiment is mainly described.

The process in Step S51 to S54 of FIG. 12 is the same as the process of Step S1 to S4 in the first embodiment.

Figure 13A:
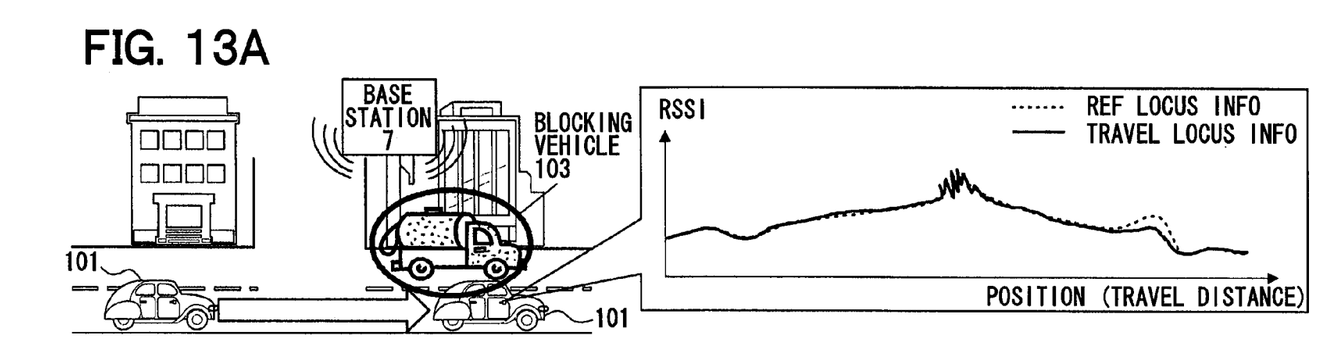
FIGS. 13A/B are illustrative diagrams about the travel locus information with features caused by a blocking vehicle or by a road work backfill.

In Step S55, the travel locus information generated in Step S51 and the reference locus information that is determined to be received in Step S54 are compared with each other, and the differences between the travel locus and the reference locus information are detected. For example, as shown in FIG. 13A, when generating the travel locus information, there may be a blocking vehicle 103 between a subject vehicle 101 and the base station 7, which leads to a situation in which a feature resulting from the blocking vehicle 103 appears in the travel locus information, and a feature resulting from the blocking vehicle 103 does not appear in the reference locus information, making differences among them.

Figure 13B:
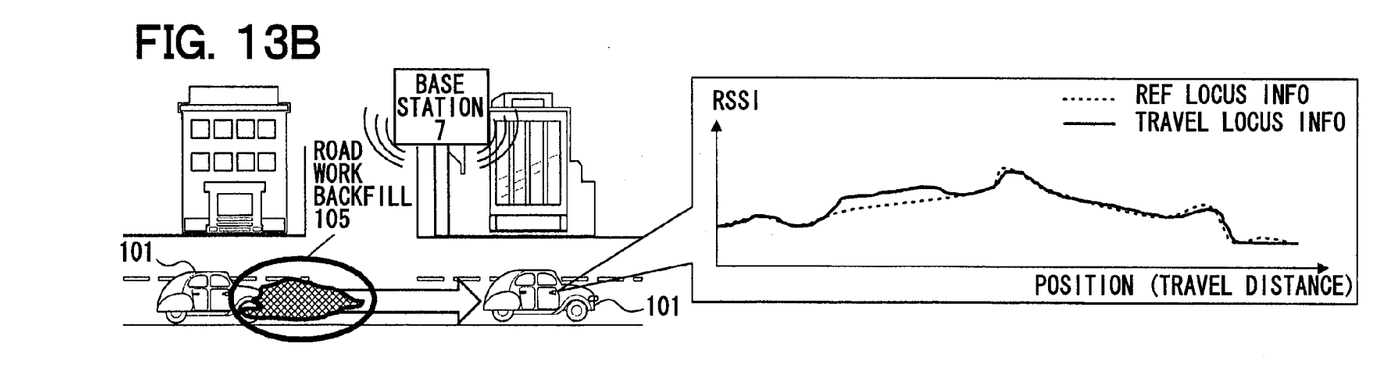

Further, as shown in FIG. 13B, when generating the travel locus information, there may be a road work backfill 105 in a proximity of the subject vehicle 101, which causes a feature resulting from the road work backfill 105 to appear in the travel locus information, and not to appear in the reference locus information, making differences among them.

As shown in FIG. 11A, differences may be observed between the travel locus information and the reference locus information. The differences between the travel locus information and the reference locus information may be, for example, the differences due to a difference of the sampling density between the travel locus information and the reference locus information, or due to a difference of the resolution about the wireless communication state between the travel locus information and the reference locus information, among others.

In Step S56, a feature in the travel locus information or in the reference locus information resulting in the difference detected in Step S55 is identified. Then, it is determined whether any filter that is suitable to reduce the feature is available. In case that the determination of Step S56 is subsequent to the negative determination in Step S62, which is mentioned later, it is determined in this Step S56 that any filter that has not yet been set in Step S57 to be mentioned later is suitable for the reduction of the feature.

When a suitable filter is found in Step S56, the process proceeds to Step S57, and when no suitable filter is found, the process proceeds to Step S65.

In Step S57, in order to reduce the feature, the most suitable filter found in Step S56 is set. In case that this Step S57 is repeated due to the negative determination in Step S62 that is mentioned later, the most suitable filter is set out of the filter which has not yet been set or used.

In Step S58, from among the travel locus information and the reference locus information, the one having the feature identified in Step S56 appearing therein is determined as an object of the filtering.

In Step S59, the filtering is performed by applying the filter found in Step S57 to the object determined in Step S58. However, when it is difficult to design a filter which reduces only the identified feature, the filtering may be performed for both of the travel locus information and the reference locus information.

For example, in case that a difference between the travel locus information and the reference locus information is observed as the one shown in FIG. 11A, the filtering by the low-pass filter may be used for the reduction of the difference regarding the high frequency feature as shown in FIG. 11B. Alternatively, by performing the filtering using the high-pass filter, the difference regarding the low frequency feature may be reduced as shown in FIG. 11C.

The process of Step S60 and S61 is the same as the process of Step S9 and S10 in the first embodiment.

In Step S62, it is determined whether the reliability computed in Step S61 is equal to or greater than the threshold set in advance. When the reliability is equal to or greater than the threshold, the process proceeds to Step S63, and, when the reliability is less than the threshold, the process proceeds to Step S56.

The process of Step S63 and S64 is the same as the process of Step S12 and S13 in the first embodiment.

On the other hand, when the negative determination is performed in Step S56, the process proceeds to Step S65, and the threshold used in the determination in Step S62 is lowered by a preset value from the "at-the-moment" value of the threshold. The preset value of lowering of the threshold is set in advance.

The process proceeds to Step S66 after Step S65 or after the negative determination in Step S54, and the second positioning process is performed. The second positioning process is a process in which a well-known positioning is performed, such as a dead-reckoning (DR), or a self-contained navigation (SCN) using the vehicle speed and gyro sensor 13.

3. Effect of Terminal Unit 1

According to the present embodiment, in addition to the effects (1B) of the first embodiment mentioned above, the following effects are achieved.

(3A) According to the present embodiment, based on the comparison between the travel locus information and the reference locus information in Step S55, the feature resulting from the blocking vehicle 103 or from the road work backfill 105 or the like is detected as the mismatch. Then, a filter for reducing such a feature is set (Step S56, S57) and the filtering is performed by using the filter (Step S59), thereby enabling a reduction of the feature resulting from the blocking vehicle 103, the road work backfill 105 or the like in the travel locus information. Therefore, a degree of matching between the two (i.e., between the travel locus information and the reference locus information) is raised, and the positioning accuracy of the subject vehicle is improved.

(3B) According to the present embodiment, a loop of processing by Step S56 to S62 is repeated (a) until the reliability is raised to be equal to or greater than the threshold, or (b) until there is no suitable filter left un-tested. Therefore, the terminal device 1 can choose and use a suitable filter from among many filters (that are available at hand/in the vehicle).

Other Embodiments

Although the present disclosure has been described in connection with preferred embodiment thereof with reference to the accompanying FIGS., it is to be noted that various changes and modifications will become apparent to those skilled in the art.

(1) In the first embodiment mentioned above, the resolution about the wireless communication state may be obtained in Step S5 for each of (i) the travel locus information generated in Step S1 and (ii) the reference locus information that is determined to be received in Step S4. Then, in Step S7, from among the two information (i.e., among the travel locus information and the reference locus information), the one having the higher resolution that is obtained in Step S5 may be set as an object of the filtering. However, the object of the filtering may be both of the travel locus information and the reference locus information.

In the above-mentioned case, the following effects are expected. In the travel locus information and the reference locus information, the higher the resolution of the information is, the greater the amount of the high frequency component becomes.

The resolution difference (i.e., mismatch) between the travel locus information and the reference locus information causes a greater degree of mismatching in the matching process. In other words, the difference of resolutions is a factor of mismatching between the travel locus information and the reference locus information.

Among the travel locus information and the reference locus information, the terminal device 1 performs the filtering with the low-pass filter at least for the one having the higher resolution, and reduces the high frequency component.

After such filtering, the matching between the travel locus information and the reference locus information results in a higher degree of matching result. As a result, the matching between actual and reference loci is accurately performed, and the positioning accuracy of the subject vehicle is improved.

(2) The terminal device 1 in the first to third embodiments may be equipped with a database that memorizes the reference locus information. In such case, the terminal device 1 obtains the reference locus information from that database. Further, in such case, the terminal device 1 may add the travel locus information generated by the subject vehicle to the above-mentioned database for updating the reference locus information.

Further, the terminal device 1 may add both of the travel locus information generated by the subject vehicle and the travel locus information generated by the other vehicle to the above-mentioned database for updating the reference locus information.

(3) The terminal device 1 in the first to third embodiments may be disposed in a movable object (e.g., in trains, in vessels, in airplanes, etc.) other than the automobiles.

(4) In the first to third embodiment, the wireless communication state used for generating the travel locus information may be information other than RSSI. That is, for example, a slope of the received signal strength, a phase difference between two adjacent sub-channels when the received wave is divided into multiple sub-channels, a received signal strength of one of the multiple sub-channels, or the like, may be used to generate the travel locus information.

(5) In the first to third embodiments, the base station 7 may have a function of the server 5. Also, the server 5 may have a function of the base station 7.

(6) A function in one component in any one of the above embodiments may be distributed to several components, or functions of many components may be aggregated into one component. Further, a part of the configuration of the above-mentioned embodiment may be replaced with a publicly-known component having the same function. Further, a part of the configuration of the above-mentioned embodiment may be added to the other embodiment, or may be replaced with a part of the component of the other embodiment. The present disclosure includes all forms of technical thought that is made more apparent to those skilled in the art by the appended claims.

(7) The present disclosure may also be realizable in various forms, e.g. a position estimation system that includes the terminal device of the above as a part of the system, or a program that controls a computer to be serving as the terminal device of the above, a computer-readable medium that stores such a program, a position estimation method regarding a movable body or the like.

What is claimed is:

1. A terminal device includes:
   a communication state obtain unit obtaining a state of wireless communication for a movable body;
   a travel locus information generation unit generating travel locus information that associates each of positions along a travel direction of the movable body with the state of wireless communication at each of the positions of the movable body;

a reference locus information obtain unit obtaining reference locus information, the reference locus information including the travel locus information regarding a past travel of the movable body or other objects, and at least one position in the reference locus information referring to a feature point defined as an absolute position;

a measurement unit obtaining a position of the movable body along a travel direction based on a matching between the travel locus information and the reference locus information and a finding of a positional relationship between the feature point and the position along the travel direction;

an mismatch detection unit detecting one of (i) a degree of mismatch in the matching by the measurement unit and (ii) a cause of mismatch in the matching by the measurement unit; and a filtering unit filtering at least one of the travel locus information and the reference locus information, a method of the filtering being preset according to one of the mismatch and the cause of the mismatch, wherein the measurement unit performs the matching before the filtering by the filtering unit, which increases the measurement accuracy of the terminal device.

2. The terminal device of claim 1, wherein
the detection unit detects the cause of the mismatch based on the mismatch between the travel locus information and the reference locus information.

3. The terminal device of claim 2, wherein
the mismatch between the travel locus information and the reference locus information is a mismatch due to a difference of sampling densities between the travel locus information and the reference locus information, or a mismatch due to a difference of resolutions between the travel locus information and the reference locus information regarding the state of wireless communication.

4. The terminal device of claim 1, wherein
the cause of the mismatch is a difference of sampling densities between the travel locus information and the reference locus information, and
the filtering by the filtering unit reduces a high frequency component in at least one of the travel locus information and the reference locus information having a higher sampling density.

5. The terminal device of claim 1, wherein
the cause of the mismatch is a mismatch due to a difference of resolution between the travel locus information and the reference locus information regarding the state of wireless communication, and
the filtering by the filtering unit reduces a high frequency component in at least one of the travel locus information and the reference locus information having a higher resolution regarding the state of wireless communication.

6. The terminal device of claim 1 further comprising:
a wireless communication source information obtain unit obtaining wireless communication source information regarding at least one of information items including a position of a transmission station of wireless communication, an altitude of the transmission station of wireless communication, a transmission cycle of wireless communication, a transmission frequency of wireless communication, a transmission power of wireless communication, and a directivity of an antenna used in a transmission of wireless communication; and
a virtual reference locus information generation unit generating a virtual reference locus information based on the wireless communication source information, wherein
the detection unit detects the mismatch or the cause of the mismatch based on a mismatch between the travel locus information and the virtual reference locus information.

* * * * *